(12) United States Patent
Stroud

(10) Patent No.: US 8,951,544 B2
(45) Date of Patent: Feb. 10, 2015

(54) ELASMOBRANCH-REPELLING ELECTROPOSITIVE METALS AND METHODS OF USE

(71) Applicant: Eric Matthew Stroud, Oak Ridge, NJ (US)

(72) Inventor: Eric Matthew Stroud, Oak Ridge, NJ (US)

( * ) Notice: Subject to any disclaimer, the term of this patent is extended or adjusted under 35 U.S.C. 154(b) by 0 days.

(21) Appl. No.: 14/304,654

(22) Filed: Jun. 13, 2014

(65) Prior Publication Data

US 2014/0360084 A1 Dec. 11, 2014

Related U.S. Application Data

(62) Division of application No. 11/800,545, filed on May 7, 2007, now abandoned.

(60) Provisional application No. 60/798,504, filed on May 8, 2006.

(51) Int. Cl.
| | |
|---|---|
| *A01M 29/24* | (2011.01) |
| *A01M 1/24* | (2006.01) |
| *A01K 83/00* | (2006.01) |
| *A01K 97/00* | (2006.01) |
| *B63C 11/02* | (2006.01) |
| *B63B 35/85* | (2006.01) |

(52) U.S. Cl.
CPC ............... *A01K 97/00* (2013.01); *B63C 11/02* (2013.01); *B63B 35/85* (2013.01)
USPC .............................. 424/405; 43/124; 43/43.16

(58) Field of Classification Search
USPC ........................................................ 424/405
See application file for complete search history.

(56) References Cited

U.S. PATENT DOCUMENTS

| | | | |
|---|---|---|---|
| 2,879,618 A | 3/1959 | Kirkland, Jr. | |
| 3,683,280 A | 8/1972 | Holt | |
| 3,822,403 A | 7/1974 | Coleman et al. | |
| 4,667,431 A | 5/1987 | Mendicino | |
| 4,792,367 A | 12/1988 | Lee | |
| 4,895,607 A | 1/1990 | Yang et al. | |
| 4,917,778 A | 4/1990 | Takada et al. | |
| 4,937,966 A | 7/1990 | McKenzie | |
| 5,129,963 A | 7/1992 | Panchanathan et al. | |
| 5,636,467 A | 6/1997 | Adams | |
| 5,719,543 A | 2/1998 | Berling | |
| 5,924,236 A | 7/1999 | Preston | |
| 5,941,010 A | 8/1999 | Latwesen | |
| 6,176,033 B1 | 1/2001 | Latwesen | |
| 6,301,822 B1 | 10/2001 | Zernov | |
| 6,506,265 B2 | 1/2003 | Yamamoto et al. | |
| 6,551,234 B1 | 4/2003 | Martello | |
| 6,606,963 B1 | 8/2003 | Wynne | |
| 6,671,997 B2 | 1/2004 | Lindgren | |
| 7,037,153 B1 | 5/2006 | Wynne | |
| 7,270,083 B2 | 9/2007 | Wescombe-Down | |
| 7,507,132 B2 | 3/2009 | Grune et al. | |
| 2004/0263303 A1 | 12/2004 | Kuriyama et al. | |
| 2005/0039692 A1 | 2/2005 | Wescombe-Down | |
| 2007/0256623 A1 | 11/2007 | Stroud | |
| 2009/0038205 A1 | 2/2009 | Stroud | |
| 2010/0016346 A1 | 1/2010 | Stroud | |
| 2010/0203154 A1 | 8/2010 | Stroud et al. | |

FOREIGN PATENT DOCUMENTS

| | | |
|---|---|---|
| EP | 0726303 A2 | 8/1996 |
| WO | WO 2006/088793 | 8/2006 |

OTHER PUBLICATIONS

Activity Series of the Metals, published on the Web, 2002; accessed Nov. 9, 2009.
CRC Handbook of Chemistry and Physics: a ready-refernece book of chemical and physical data, 89th edition, 2008-2009, Section 9, p. 77.
http://www.kjmagnetics/proddetail.asp?prod=RX054 downloaded Oct. 31, 2012.
http://www.kjmagnetics/proddetail.asp?prod=BYOY08 downloaded Oct. 31, 2012.

*Primary Examiner* — Audrea Buckley
(74) *Attorney, Agent, or Firm* — Hoxie & Associates, LLC

(57) ABSTRACT

Devices and methods are disclosed for repelling elasmobranchs with electropositive metals, including apparatuses and methods for reducing by-catch in commercial fisheries and protecting humans from attacks by elasmobranchs.

18 Claims, 7 Drawing Sheets

ELASMOBRANCH-REPELLING ELECTROPOSITIVE METALS AND METHODS OF USE

INTRODUCTION

This invention relates generally to electropositive metals for repelling elasmobranchs and methods of using electropositive metals to repel elasmobranchs.

BACKGROUND OF THE INVENTION

Elasmobranchs represent a significant problem in the commercial fishing industry. Elasmobranchs are often inadvertently caught on fishing tackle directed at other more commercially valuable kinds of fish. This inadvertent catching of elasmobranchs (or other non-valued fish) is called "by-catch." As many as 100 million elasmobranchs are killed each year as by-catch. This loss of life has resulted in a real threat to several shark species. Currently, as many as 80 species of shark are considered threatened with extinction.

Further, when elasmobranchs are caught as by-catch, fishing operations receive no return on their investment since the shark is caught on a hook that might have otherwise brought in a marketable fish. Additionally, the fishing tackle on which a shark is caught often must be cut loose for the safety of those working on the fishing vessel causing a loss of both equipment and time.

Longlining is a commercial fishing method that suffers significant losses from shark by-catch. Longlining uses multiple baited individual fish hooks with leaders strung at intervals along an often very long (2-3 miles) main fishing line. Longline fishing operations routinely target swordfish and tuna. The longline hooks, however, are not selective and elasmobranchs are sometimes caught in greater numbers than the intended catch. The result is great loss of life in elasmobranchs and significant financial losses in the longline industry. Elasmobranchs cause additional losses in the longline fishing industry by scavenging marketable fish caught on longlines before the fish may be retrieved for processing.

Elasmobranchs also represent a problem in the commercial trawling industry. Trawling is a commercial fishing method that catches fish in nets. Elasmobranchs cause significant losses for trawlers because they scavenging fish caught in trawl nets before they are retrieved for processing. As such, valuable fish are often lost to shark predation. Also, sharks often tear holes in the nets, resulting in partial or complete loss of catch and significant repair costs.

There has been a long-felt need for methods and devices to deter elasmobranchs from commercial fishing lines and nets. Attempts in the middle of the twentieth century were made to protect trawl nets with electric discharge devices (Nelson, "Shark Attack and Repellency Research: An Overview," Shark Repellents from the Sea ed. Bernhard Zahuranec (1983) at pg. 20). Nevertheless, no commercially effective repellent has yet to be made available for reducing shark by-catch in the commercial fishing industry or for reducing loss of valuable fish or fishing tackle to shark predation. Further, Applicant is unaware of any consideration in the art of the use of electropositive metals to repel elasmobranchs to limit by-catch and other losses from elasmobranchs.

An effective shark repellent would not only be valuable to the fishing industry but also would be valuable for protecting humans from shark attacks. No effective repellent has yet to be marketed for limiting the risk of shark attacks faced by humans exposed to elasmobranchs. Over the last 50 years antishark measures employed to protect humans from shark have included electrical repellent devices (Gilbert & Springer 1963, Gilbert & Gilbert 1973), acoustical playbacks (Myrberg et al. 1978, Klimley & Myrberg 1979), visual devices (Doak 1974) and chemical repellents (Tuve 1963, Clark 1974, Gruber & Zlotkin 1982). None of these procedures proved satisfactory in preventing shark attacks. (Sisneros (2001)). As such, the long felt need for an effective repellent had not been satisfied.

Researchers have historically used several bio-assays to determine if a repellent evokes a flight response in shark. One such bio-assay measures the effect of a repellent on a shark that is immobilized in "tonic immobility." Tonic immobility is a state of paralysis that typically occurs when a shark is subject to inversion of its body along the longitudinal axis. This state is called "tonic," and the shark can remain in this state for up to 15 minutes thereby allowing researchers to observe effects of repellents. After behavioral controls are established, an object or substance that has a repelling effect will awaken a shark from a tonic state. Researchers can quantify the strength of a repellent effect from these studies.

BRIEF SUMMARY OF THE INVENTION

The applicant has discovered that an electropositive metal is an effective elasmobranch repellent useful in limiting by-catch as well as protecting humans. Electropositive metals, particularly the Lanthanide metals, known or hereinafter developed, that are of sufficient electropositivity to repel elasmobranchs are acceptable in aspects of the present invention.

According to a non-limiting embodiment of the present invention, an apparatus for repelling elasmobranchs is provided comprising an electropositive metal. Preferably, the electropositive metal is a Lanthanide metal. More preferably, the electropositive metal is a Mischmetal. Electropositive metals may have a shape of a cylinder, a cone, a circle, a cube, a disk, a bar, a sphere, a plate, a rod, a ring, a tube, a stick or a block.

Electropositive metals of the present invention preferably have a revised Pauling electronegativity of less then 1.32. In a non-limiting embodiment, an electropositive metal has a cathode half-cell standard electrode potential greater then 1.9 volts in aqueous solution. In a non-limiting embodiment, the electropositive metal is a Lanthanide metal, a Mischmetal, an Alkaline Earth metal, an Alkali metal, or a Group 3 metal on the periodic table.

According to a first non-limiting aspect of the present invention, an apparatus is provided comprising an electropositive metal and a buoy, a barge, a net, fishing tackle or any combination thereof. Fishing tackle may comprise a longline, a main line, a gangion, a branchline, a weight, a buoy, a net, or any combination thereof.

According to a second non-limiting aspect of the present invention, an apparatus is provided comprising an electropositive metal and a fish hook. Such fish hook may be individual or attached to longline or mainline and such fish hook may have a single or multiple hooks.

According to a third non-limiting aspect of the present invention, an apparatus is provided comprising a surfboard and an electropositive metal.

In fourth non-limiting aspect of the present invention, a method is provided for repelling elasmobranchs comprising attaching an electropositive metal to a human body or to clothing or accessories associated with a human body. In an aspect of the invention, an electropositive metal may be attached to a human ankle or wrist. In a further aspect an electropositive metal may be attached to a bracelet. In yet a further aspect an electropositive metal may be attached to a belt, a weight belt for diving or flippers. In yet a further aspect, an electropositive metal may be housed within a surfboard or attached to a surfboard. In yet another aspect, an electropositive metal may be trailed along with a human in water.

BRIEF DESCRIPTION OF THE DRAWINGS

The invention will now be described by way of example with reference to the accompanying drawings wherein:

FIG. 2A illustrates an electropositive metal attached to the line above the hook. FIG. 2B illustrates an electropositive metal attached to the hook. FIG. 2C illustrates an electropositive metal attached to the hook shank and clear of the hook eye.

FIG. 3A illustrates an electropositive metal attached to the line above the hook. FIG. 3B illustrates an electropositive metal attached to the hook. FIG. 3C illustrates an electropositive metal attached to the hook shank and clear of the hook eye.

FIG. 4A illustrates an electropositive metal attached to the line above the hook. FIG. 4B illustrates an electropositive metal attached to the hook.

FIG. 6A illustrates a buoy and electropositive metal and a net with a plurality of electropositive metals in accordance with the invention. FIG. 6B illustrates a barge and an electropositive metal.

FIG. 7A illustrates a surfboard with an electropositive metal that is capable of spinning in accordance with the invention. FIG. 7A illustrates a surfboard with an electropositive metal embedded in or attached to the surfboard in accordance with the invention. FIG. 7B illustrates exemplary surfboards in accordance with an aspect of the invention.

FIG. 8A illustrates a belt or weight belt with an electropositive metal in accordance with the invention. FIG. 8B illustrates a bracelet or wristband with an electropositive metal in accordance with the invention. FIG. 8C illustrates flippers for snorkeling or diving with an electropositive metal in accordance with the present invention.

DETAILED DESCRIPTION OF THE INVENTION

Figure 1:
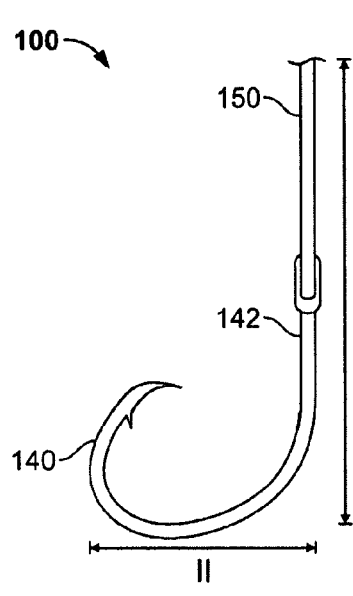
FIG. 1 illustrates a traditional circle hook (40) attached to a line (30) and preferred zone (I) for locating an electropositive metal in accordance with the present invention.

"By-catch" is any kind of fish that is caught in a fishing operation wherein the catching of the fish is not the object of the fishing operation. For example, if the target fish of a longline fishing operation is tuna, an elasmobranch caught on a hook of the longline is by-catch.

"Elasmobranchs" in this specification means one or more elasmobranchii in the super-orders Galeomorphii, Squalomorphii, and Batoidea and orders Squaliformes (dogfish), Carcharhiniformes (requiem sharks), Lamniformes (mackerel sharks), Rajiformes (true rays), Pristiformes (sawfishes), Torpediniformes (electric rays) and certain Orectolobiformes (carpet sharks). Elasmobranchs in this specification includes nurse sharks, an Orectolobiform, but this specification does not include the other carpet sharks, such as wobbegongs.

An "Electropositive metal" is a metal which readily donates electrons to form positive ions. Electropositive metals are strong reducing agents and all react with water to some degree, typically liberating hydrogen gas or forming a hydroxide. The most electropositive metals tends to be found on the left-hand side of the Periodic Table of the elements, particularly in Groups I, II, III, and the Lanthanides. In general, electropositivity decreases and electronegativity increases as one moves to the right hand side of the Periodic Table of the elements. The most electropositive metal known is Francium, which is radioactive. The most stable electropositive metal is Cesium which is highly reactive in water and air. Electropositive metals typically do not exhibit any permanent magnetism (ferromagnetism) at room temperature.

"Revised Pauling Electronegativity" is a chemical property which describes the power of an atom to attract electrons towards itself. First proposed by Linus Pauling in 1932 as a development of valence bond theory it has been shown to correlate with a number of other chemical properties. Electronegativity cannot be directly measured and must be calculated from other atomic or molecular properties The Pauling electronegativity for an element is calculated using the dissociation energies of at least two types of covalent bonds formed by that element. Linus Pauling's original values were updated in 1961 to take account of the greater availability of thermodynamic data, and it is these "Revised Pauling" values of the electronegativity which are most usually used.

"Standard Electrode Potential" is the measure of the individual potential of any electrode at standard ambient conditions, which is at a temperature of 298K, solutes at a concentration of 1 M, and gases at a pressure of 1 bar. The basis for an electrochemical cell such as the galvanic cell is always a reduction-oxidiation reaction which can be broken down into two half-reactions: oxidation at anode (loss of electron) and reduction at cathode (gain of electron). Electricity is generated due to electric potential difference between two electrodes. This potential difference is created as a result of the difference between individual potentials of the two metal electrodes with respect to the electrolyte (In practice, seawater serves as the conductive electrolyte). In an electrochemical cell, an electropositive metal acts as the cathode, and the standard electrode potential represents the voltage of the reduction half-cell reaction.

A "Lanthanide metal" belongs to the series comprising the 15 elements with atomic numbers 57 through 71, from Lanthanum to Lutetium. All lanthanides are f-block elements, corresponding to the filling of the 4f electron shell, except for lutetium which is a d-block Lanthanide. The Lanthanide series is named after Lanthanum. The Lanthanide series is also commonly referred to as the "rare earths" or "rare earth elements".

"Mischmetal" is an alloy of Lanthanide elements in various naturally-occurring proportions. The term "Mischmetal" is derived from the German "Mischmetall" meaning mixed metals. Mischmetals are also called Cerium mischmetal, rare earth mischmetal or misch metal. A typical composition includes approximately 50% Cerium and 45% Lanthanum, with small amounts of Neodymium and Praseodymium.

Other Mischmetal alloy mixtures include Lanthanum-rich Mischmetal, Ferrocerium, and Neodymium-Praseodymium Mischmetal.

An "Alkaline Earth" metal belongs to the series of elements comprising Group 2 of the Periodic Table of elements: Beryllium, Magnesium, Calcium, Strontium, Barium, and Radium. The alkaline earth metals are silvery colored, soft, low-density metals, which react readily with halogens to form ionic salts, and with water to form strongly alkaline hydroxides.

An "Alkali Earth" metal belongs to the series of elements comprising Group I of the Periodic Table of elements: Lithium, Sodium, Potassium, Rubidium, Cesium, and Francium. The alkali metals are all highly reactive and are rarely found in elemental form in nature. As a result, in the laboratory they are stored under mineral oil. They also tarnish easily and have low melting points and densities.

A "Group 3 metal" belongs to the third vertical column of the Periodic Table of elements. While Lanthanides are usually considered part of Group 3, the metallic elements Yttrium and Scandium all always considered Group 3 metals. The physical properties of Yttrium and Scandium resemble Lanthanides and these two metals are commonly considered part of the "rare earths".

"Longline" refers to a fishing line that may extend up to many miles wherein a mainline extends the full length of the longline and individual shorter gangion lines attached to the mainline are spaced at set intervals (perhaps several feet or meters or perhaps 1000 feet or greater apart). Hooks are attached to the individual gangion lines. Hooks may be baited and used to catch target fish. The addition of an electropositive metal repels elasmobranchs from the baited hooks as well as from the region of the longline generally.

"Target fish" is any kind of fish, the catching of which is the object of a fishing operation. For example, the target fish of a longline fishing operation may be tuna. A fish that is caught on the longline that is not tuna would not be a target fish.

"Tonic immobility" is the state of paralysis that typically occurs when an elasmobranch is subject to inversion of its body along the longitudinal axis of the body, i.e., is belly up. An elasmobranch can remain in this state for up to 15 minutes. While in tonic immobility, the shark is comatose and unresponsive to many external stimuli. Biologists often perform surgery on sharks using tonic immobility, precluding anesthesia. An effective shark repellent terminates tonic immobility, often violently, thus, tonic immobility is useful as a bioassay for testing the effectiveness of electropositive metals.

I. ELECTROPOSITIVE METALS AS REPELLENTS OF ELASMOBRANCHS

The applicant first observed the unusual repellent effects of electropositive Lanthanide metals on sharks when tonically-immobilized juvenile lemon sharks (*N. brevirostris*) exhibited violent rousing behavior in the presence of a 153 gram 99.95% Samarium metal ingot. As the Samarium metal was moved towards the immobilized shark's head, the shark terminated tonic immobility, in the direction away from the approaching metal. For experimental controls, pure Chromium, an antiferromagnetic metal, and pyrolytic graphite, a highly diamagnetic substance, failed to produce any behavioral responses in juvenile lemon sharks.

A polystyrene white plastic blinder was used to remove any visual and motion cues from an approaching electropositive metal. This blinder was placed close to the shark's eye, sufficiently shielding its nares, eyes, gills, and head up to its pectoral fin. Again, Samarium metal terminated tonic immobility in all test subjects at a range of 2 to 50 cm from the blinder. Chromium metal and pyrolytic graphite did not produce any notable behavioral shifts. In order to confirm that pressure waves were not affecting the test subjects, the tester's hand was moved underwater towards the shark's head both with and without blinders at varying speeds. This motion also did not disrupt the immobilized state. The same series of experiments were repeated with juvenile nurse sharks (*G. cirratum*) and yielded the same behavioral results.

The same experimental protocol was repeated with a 73 gram ingot of 99.5% Gadolinium metal, an electropositive Lanthanide metal, and yielded the same behavioral results in both juvenile lemon sharks and nurse sharks. It is noted that the rousing behavior was most violent when Samarium metal was used. Additionally, the Gadolinium metal corroded quickly after seawater exposure, and therefore would be appropriate for a one-time use application.

In order to eliminate the possibility of galvanic cell effects, juvenile sharks were removed from their pens and brought at least 15 meters away from any submerged metal objects. All testers and witnesses removed watches, rings, and jewelry so that only the lanthanide metal was exposed to seawater. The same experimental method was repeated in lemon sharks and we report that tonic immobility was terminated with electropositive Samarium metal in all tests.

The application has discovered that waving Samarium or Gadolinium in air above immobilized or resting sharks does not effect behavior, even when the metal is very close to the water's surface. The electropositive metal must be in contact with seawater in order to produce the repellent effect. This is notably different from the effects of a rare-earth magnet, which will often terminate tonic immobility at close range in air.

The effects of an electropositive Lanthanide metal on free-swimming sharks were also evaluated. Two juvenile nurse sharks (less than 150 cm total length) were allowed to rest in an open-water captive pen. The tester approached the nurse sharks and moved his hand near the pen wall. His hand contained no metal. Both nurse sharks remained at rest. Next, the tester presented the 153 gram ingot of electropositive Samarium metal underwater to the pen wall and we note that both nurse sharks awakened and rapidly swam away from the tester's locale. Next, a highly-stimulated competitively-feeding population of six blacknose sharks (*C. acronotus*) (total length up to 120 cm) and six Caribbean reef sharks (*C. perezii*) (total length up to 210 cm) was established using chum and fish meat. A diver entered the water near the population of sharks with the 153 gram of Samarium metal secured to one end of a 1.5 meter-long polyvinyl chloride pole. As free-swimming sharks swam close to the diver, the control end of the pole (without metal) was presented in a left-right waving motion. Approaching sharks would swim past, bump, or briefly bite the pole. The diver then turned the Samarium metal-end of the pole towards the approaching sharks. All blacknose sharks exhibited a "twitching" or "jerking" behavior as they came near the metal ingot and quickly swam away. Caribbean reef sharks generally avoided the metal, but did not exhibit the twitching behavior.

Following the aforementioned initial experiments, many electropositive metals were procured and presented to tonic-immobilized juvenile sharks. The violence of the shark's response to each metal was scored on a scale of 0 to 4, with 0 equating to no response and 4 equating to a violent rousing reaction. All testing was performed in the Bahamas using open-water captive pens. Arc-melted 100 gram Lanthanide metal ingots, Calcium, and Strontium were obtained from Metallium Inc., USA. Lanthanum, Cerium, Neodymium, Yttrium, Praseodymium and Mischmetal samples were obtained from HEFA Rare Earth Metals, Canada. Magnesium, Beryllium, transition metals and nonmetals were procured as surplus items online from EBay.

In juvenile *N. brevirostris* and *G. cirratum*, the applicant has found that the following Lanthanide metals all terminated the tonic state at distances less than 0.1 meters: 100 grams of 99% purity Lanthanum metal, 90 grams of 99% purity Cerium metal, 100 grams of 99% purity Praseodymium metal, 100 grams of 99% purity Neodymium metal, 73 grams of 99.95% purity Samarium metal, 145 g of arc-melted 99% purity Terbium metal, 89 g of arc-melted 99% purity Erbium metal, 100 grams of arc-melted 99% purity Holmium metal, 100 grams of arc-melted 99% Gadolinium metal, 100 grams of arc-melted 99% Dysprosium metal, and 100 grams of arc-melted 99% purity Ytterbium metal.

In the same experiment, 75 grams of 99% purity Yttrium metal, a Group 3 metal, also terminated tonic immobility in juvenile *N. brevirostris*.

In the same experiment, a 30 gram 99% purity ingot of Strontium and separately, a 40 gram 99% purity ingot of Calcium terminated tonic immobility in juvenile *G. cirratum*. These metals were highly reactive in seawater and dissolved before a second series of tests could be performed.

In the same experiment, the following Misch.metals terminated tonic immobility in *N. brevirostris*: An 80 gram slice of Cerium Misch.metal, and a 100 gram slice of Neodymium-Praseodymium Mischmetal.

In the same experimental, the following Alkaline Earth metals terminated tonic immobility in *N. brevirostris*: A 70 gram block of 99% Magnesium, and a 10 gram pellet of 99% purity Barium. The Barium pellet reacted violently with seawater and a subsequent test could not be performed.

Transition metals and nonmetals, which are much less electropositive than the Lanthanides, Alkali, Alkaline Earth, and Group 3 metals, were also screened using the tonic immobility bioassay. The following transition metals and metalloids failed to illicit a rousing response in immobilized juvenile *N. brevirostris*: A 20 gram disc of 99.95% purity Tellurium, a 20 gram cylinder of 99.5% purity Tungsten, a 20 gram cylinder of 99.5% purity Cobalt, a 20 gram cylinder of 99.5% purity Iron, a 20 gram cylinder of 99.5% purity Niobium, a 20 gram cylinder of 99.5% purity Zirconium, a 20 gram square of 99.95% Rhenium, a 100 gram pillow of Aluminum, and a 15 gram square of pyrolytic graphite (Carbon).

Based on the aforementioned experimental results, a close correlation was found between the revised Pauling electronegativity values for the electropositive metals, and behavioral response. As the revised Pauling electronegativity decreased, the violence of the shark's response seemed to increase. A significant repellency threshold was found at a revised Pauling electronegativity of 1.32 or less—Metals with electronegativities greater than 1.32 did not produce the response. Highly reactive metals, such as Strontium and Calcium (electronegativities of 0.89 and 1.00 respectively) produced a violent rousing reaction as expected.

An electropositive metal for repelling elasmobranchs may comprise the shape of a cylinder, a cone, a circle, a cube, a disk, a bar, a sphere, a plate, a rod, a ring, a tube, a stick, a block, a tapered cone, or any other shape.

The mode of action of electropositive metals on elasmobranchs is not fully understood. While not wishing to be bound by any particular theory, one plausible theoretical explanation for this surprising finding of repellent activity of electropositive metals is the possibility that relatively high voltages, ranging from 0.8 VDC to 2.7 VDC with currents up to 0.1 milliamperes, are created between the metal and the shark's skin. This electromotive force may over-stimulate the ampullae of Lorenzini (known to be used by elasmobranchs for navigation and orientation), which saturate below 100 nanovolts, causing a highly unnatural stimulus to the shark.

Electropositive metals exhibit no measurable permanent magnetism (ferromagnetism). The applicant hypothesized that a magnetic or electrical field was being induced by the metal's movement through seawater. The applicant attempted to measure minute magnetic fields being produced by the movement of Samarium metal through seawater in a closed system. A submersible calibrated milliGauss meter probe was secured in a plastic tank containing seawater with the same salinity, pH, and temperature of the water used in previous shark testing. After zeroing out the Earth's magnetic field, the applicant did not detect any magnetic fields being produced by the movement of Samarium metal through the tank, within tenths of a milliGauss Electromotive forces generated by electropositive metals are effective repellents for elasmobranchs, excluding certain carpet sharks in the family Orectolobidae. It is believed that electropositive metals are not effective repellents against carpet sharks because carpet sharks, particularly spotted wobbegongs (*Orectolobus maculatus*), are ambush predators and rely more on visual, olfaction, and lateral line clues than this electromagnetic sense. This species of shark is found chiefly in Australia and Indonesia, and does not represent significant by-catch species or species that are known to be aggressive against humans. Electropositive metals, however, are effective against nurse sharks, another Orectolobiform.

Electropositive metals have been demonstrated to act as acceptable repellents of elasmobranchs. The repellent activity of electropositive has been shown to be better than existing shark-repellent technology with the exception of certain chemical repellents and magnetic repellents being developed by SHARK DEFENSE LLC that have a greater range of action.

A. Electromotive Forces

The repellency of an electropositive metal may be measured in a variety of ways. The applicant has found that the standard electrode potential of the cathode half-cell reaction of an electropositive metal in aqueous medium can be measured in a closed system using an electropositive metal at the anode (the site of oxidation), a piece of shark skin at the cathode (the site of reduction), and seawater as an electrolyte. Electromotive forces were measured using a calibrated direct current voltmeter. Electromotive forces greater than 0.8 volts were recorded for all electropositive metals, with Lithium metal, an Alkali earth metal, producing the highest measurable voltage at 2.71 volts. This demonstrated that cations and anions were exchanged through the electrolyte. These measured electromotive forces closely correlated to published standard electrode potentials for electropositive metals. A closed system using an electropositive metal at the external cathode (−) and a piece of shark skin at the external anode (+) with seawater electrolyte represents a simple and effective means of measuring electromotive forces and predicting repellency.

The strength of an electropositive metal's electromotive force field is inversely related to the distance an object is from the metal. As such, metals with a low standard electrode potential may repel elasmobranchs if the elasmobranch moves close enough to sense the electromotive force field of the metal. A highly electropositive metal having sufficient strength to repel an elasmobranch at sufficient distance such that the elasmobranch is deterred from striking a baited hook or coming near a person or other subject is preferred. It is more preferred that an electropositive metal have a standard electrode potential of at least 2.00 volts in seawater to provide sufficient electromotive force to repel an elasmobranch away from a baited hook or a person before the elasmobranch may bight the hook or harm the person. Because an elasmobranch may act to strike a hook or person at a distance from the target, the higher the standard electrode potential or the lower the revised Pauling electronegativity of the metal, the more effective it will be.

II. METHODS AND DEVICES FOR ELECTROPOSITIVE METALS

A. Electropositive Metals

Exemplary and non-limiting electropositive metals in accordance with the invention may be constructed of any metal that is capable of generating an electromotive force in seawater relative to the shark's skin.

Electromotive forces may be generated in any manner known to the skilled artisan who is practicing aspects of the invention or electrochemistry.

There are many varieties of electropositive metals including the Lanthanide metals, the Alkaline Earth metals, the Alkali metals, Mischmetals, and the Group 3 metals on the periodic table of elements. Any electropositive metal having sufficient standard electrode potential or a low revised Pauling electronegativity may be used as a repellent of elasmobranchs.

Exemplary electropositive metals include Lanthanum, Cerium, Neodymium, Praseodymium, Samarium, Europium, Gadolinium, Terbium, Dysprosium, Holmium, Erbium, Thulium, Ytterbium, Lutetium, Yttrium, Scandium, Lithium, Magnesium, Calcium, Strontium, Barium, Cerium Mischmetal, Neodymium-Praseodymium Mischmetal, and Lanthanum-rich Mischmetal. Electropositive metals may be flexible or inflexible.

A preferred electropositive metal contemplated within an aspect of the invention is Neodymium-Praseodymium Mischmetal. Neodymium-Praseodymium Mischmetal is a more preferred material than pure forms of Lanthanide or Alkaline earth metals due to cost and low corrosion reactivity in seawater. Pure Lanthanide metals, particularly the "late Lanthanides" comprising elements 63 through 71, are prohibitively expensive in pure form. Pure Alkali metals are extremely reactive in seawater and present fire hazards in storage. Certain Alkaline earth metals are also highly reactive in seawater, such as Barium and are too short-lived for commercial fishing applications. Highly electropositive metallic elements such as Promethium, Radium, and Francium are highly radioactive and are not feasible for any elasmobranch repelling application.

In selecting an electropositive metal, a revised Pauling electronegativity of less than 1.32 is preferred. A revised Pauling electronegativity of about 1.14 or less is more preferred since the impact of the electromotive force field will be felt at a slightly greater distance from the metal.

Early Lanthanide metals, particularly elements •57 through 62, commonly called the "early Lanthanides", possess revised Pauling Electronegativities less than 1.2, which is preferred. Similarly, Mischmetals containing combinations of Lanthanum, Cerium, Neodymium, and Praseodymium exhibit calculated revised Pauling electronegativities of less than 1.2, which is preferred.

In order to maximize electromotive forces, the surface area of an electropositive metal may be maximized. For example, a 6" diameter by 2" thick cylindrical Cerium Mischmetal block (revised Pauling electronegativity of 1.15) may be effective in repelling elasmobranchs at a range of 8 inches.

A plurality of electropositive metals may be employed to repel elasmobranchs. For example, 1" cube metals may be arranged in a 12" long bar and used to repel elasmobranchs. The cube metals may be of any electropositive metal material capable of producing sufficient electromotive force at any distance of interest from the metal to repel elasmobranchs. Alternatively, a plurality of 1" cube electropositive metals may be arranged linearly with a distance between each piece of metal.

B. Electropositive Metals in Combination with Hooks

A non-limiting aspect of the present invention is the use of electropositive metals to repel elasmobranchs from baited hooks. Exemplary and non-limiting combinations of an electropositive metal and a hook are illustrated in FIGS. 1-4. For example, in FIG. 1, an exemplary and non-limiting circle hook (140) is illustrated attached to a line (150) along with exemplary and non-limiting zone (I) in the circle hook and line where an electropositive metals may be placed or affixed. The preferred region (zone I) for metal placement is any region wherein the affixed or placed magnet does not obstruct the hook gap distance (zone II). Not more than 20% of the hook gap distance (zone II) is preferably obstructed by the metal such that the hook is not prevented from setting in the corner of the mouth of a target fish. Nevertheless, any arrangement wherein the hook is not prevented from catching target fish is acceptable. Tapered conical designs (not illustrated) are contemplated such that the diameter of the electropositive metal at the hook end is smaller than the diameter of the electropositive metal at the line end of zone I.

Figure 2A:
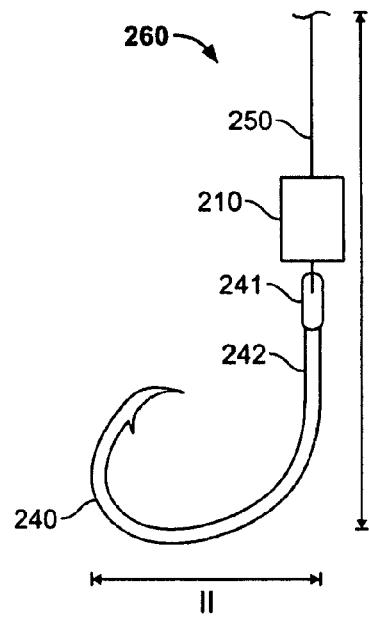
FIGS. 2A-C illustrate non-limiting positions within the zone (I) for locating an electropositive metal in accordance with the present invention.
Figure 2B:
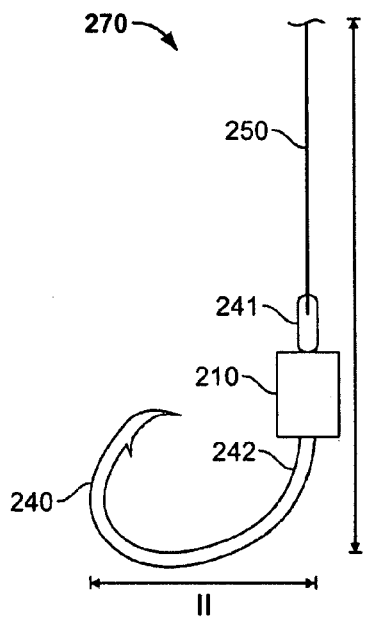
Figure 2C:
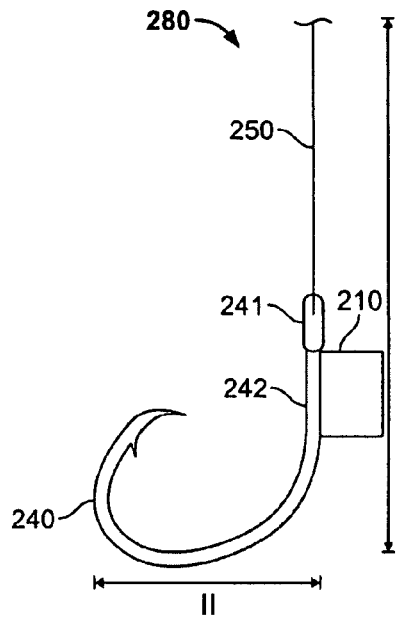

Exemplary and non-limiting combinations of an electropositive metal on a hook and line are illustrated in FIG. 2. An electropositive metal (210) may be placed in proximity to a circle or offset circle hook (240) such that it rests on the hook eye (241) providing an exemplary embodiment such as the hook-metal combination embodied at 260. An electropositive metal (210) may be placed in proximity to a circle or off-set circle hook (240) such that it rests on the shank (242) of the hook providing an exemplary embodiment such as the hook-metal combination embodied at 270. A metal (210) may be placed on a circle or offset circle hook (240) such that it is secured to the outside of the shank (242) and the hook eye (241) providing an exemplary embodiment such as the hook-metal combination embodied at 280. Vinyl electric tape (not illustrated) may be used to secure the metal. Black vinyl tape is preferred to reduce reflections of light.

Electropositive metals may be provided in any shape. It is preferred that a metal's shape not significantly obstruct the hook gap distance (zone II). The metal may comprise a hole through which a lead, or gangion, or mainline (250) or other filamentous object may pass. Exemplary non-limiting shapes may include a cube or block of any size or other object having at least one plane comprising four right angles and a hole passing through the object such that fishing line or other filament may be passed through to affix the magnet in place on fishing tackle or other object. Alternative, non-limiting shapes may also include cylindrical or other circular, oval or oblong three-dimensional shapes having a hole passing through some portion of the shape (210). Alternative, non-limiting shapes may also include a hollow pyramid or a hollow trapezoid.

Alternative, non-limiting shapes may also include a solid cube or similar shape, a solid rectangle or similar shape, a solid bar or similar shape, a solid pyramid or similar shape, a solid trapezoid or similar shape or any other shape. Metals may be shaped as a ring, a trapezoid, a series of trapezoids, a series of trapezoids arranged in a larger ring pattern, a cone, a tapered cone, a narrow or wide cylinder or in the shape of a Billy club. Preferably, the shape when combined with a hook provides a hook in proximity to an electropositive metal comprising sufficient electromotive force field strength to repel elasmobranchs.

Figure 3A:
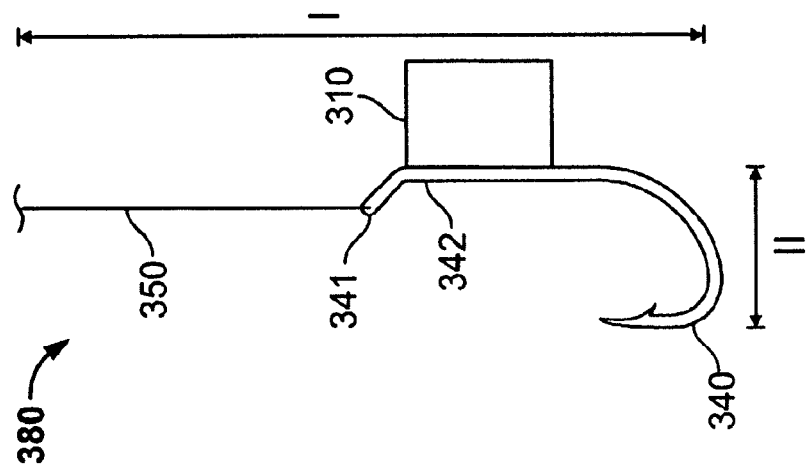
FIG. 3A-C illustrate non-limiting positions within the zone (I) for locating an electropositive metal on a J-hook in accordance with the present invention.
Figure 3B:
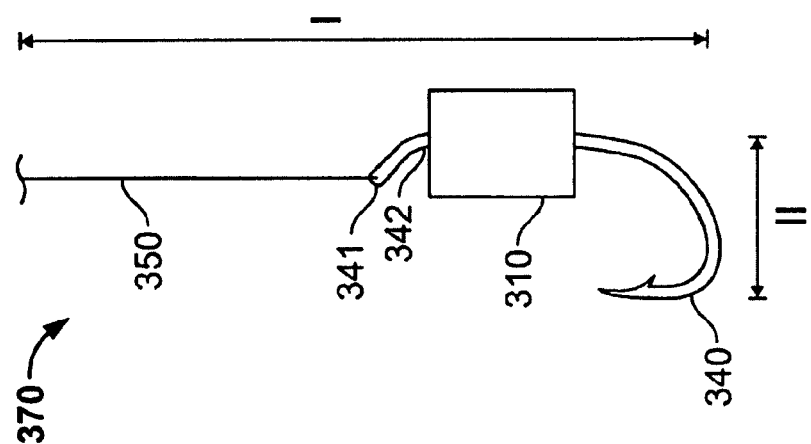
Figure 3C:
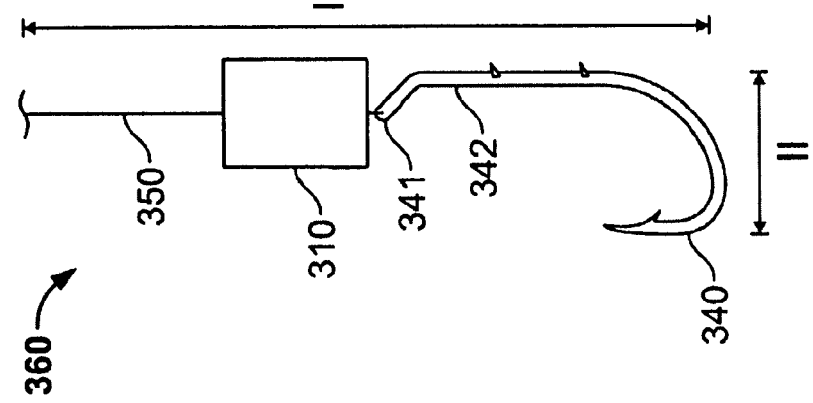

Exemplary and non-limiting combinations of electropositive metal and hook are also illustrated in FIG. 3. An electropositive metal (310) may be placed in proximity to a j-hook (340) such that it rests on the hook eye (341) providing an exemplary embodiment such as the hook-metal combination embodied at 360. An electropositive metal (310) may be placed in proximity to a j-hook (340) such that it rests on the shank (342) of the hook providing an exemplary embodiment such as the hook-metal combination embodied at 370. An electropositive metal (310) may be placed on a j-hook (340) such that it is secured to the outside of the shank (342) and the hook eye (341) providing an exemplary embodiment such as the hook-metal combination embodied at 380. As described above in the illustration of FIG. 2, electropositive metal may be provided in any shape.

Figure 4A:
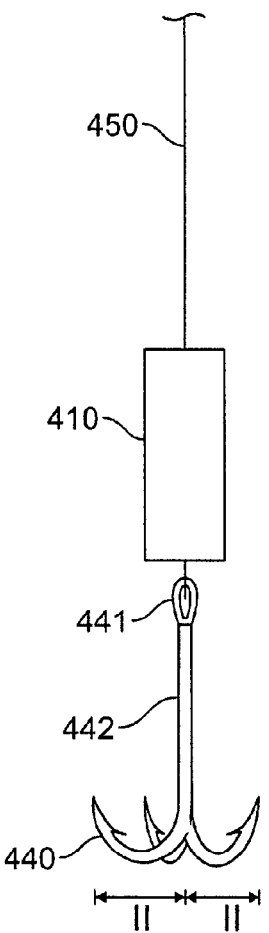
FIG. 4A-B illustrate non-limiting positions within the zone (I) for locating an electropositive metal on a treble hook in accordance with the present invention.
Figure 4B:
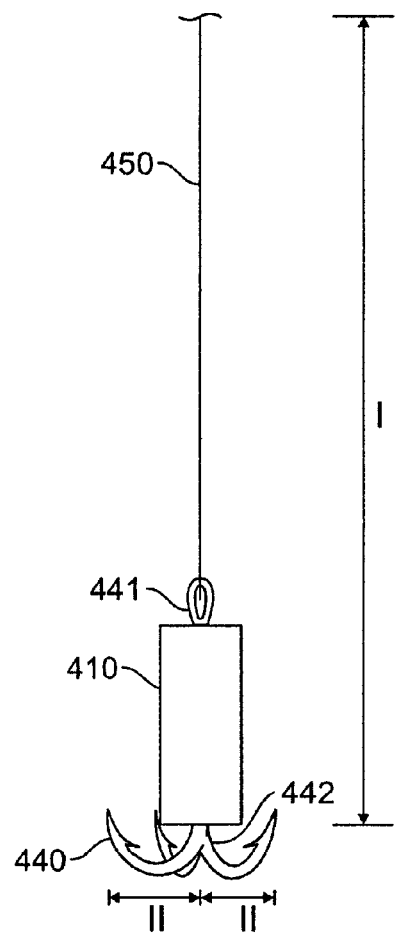

Exemplary and non-limiting combinations of an electropositive metal and hook are also illustrated in FIG. 4. An electropositive metal (410) may be placed in proximity to a treble hook (440) such that it rests on the hook eye (441) providing an exemplary embodiment such as the hook-metal combination embodied at 460. An electropositive metal (410) may be placed in proximity to a treble hook (440) such that it contacts the shank (442) of the hook providing an exemplary embodiment such as the hook-metal combination embodied at 470.

A hook in accordance with the invention may be any hook that is capable of catching target fish. The hook may comprise stainless steel, steel, galvanized metals, ferromagnetic metals or any other material, metallic or plastic or any other composite.

C. Electropositive Metals on Longlines

Figure 5:
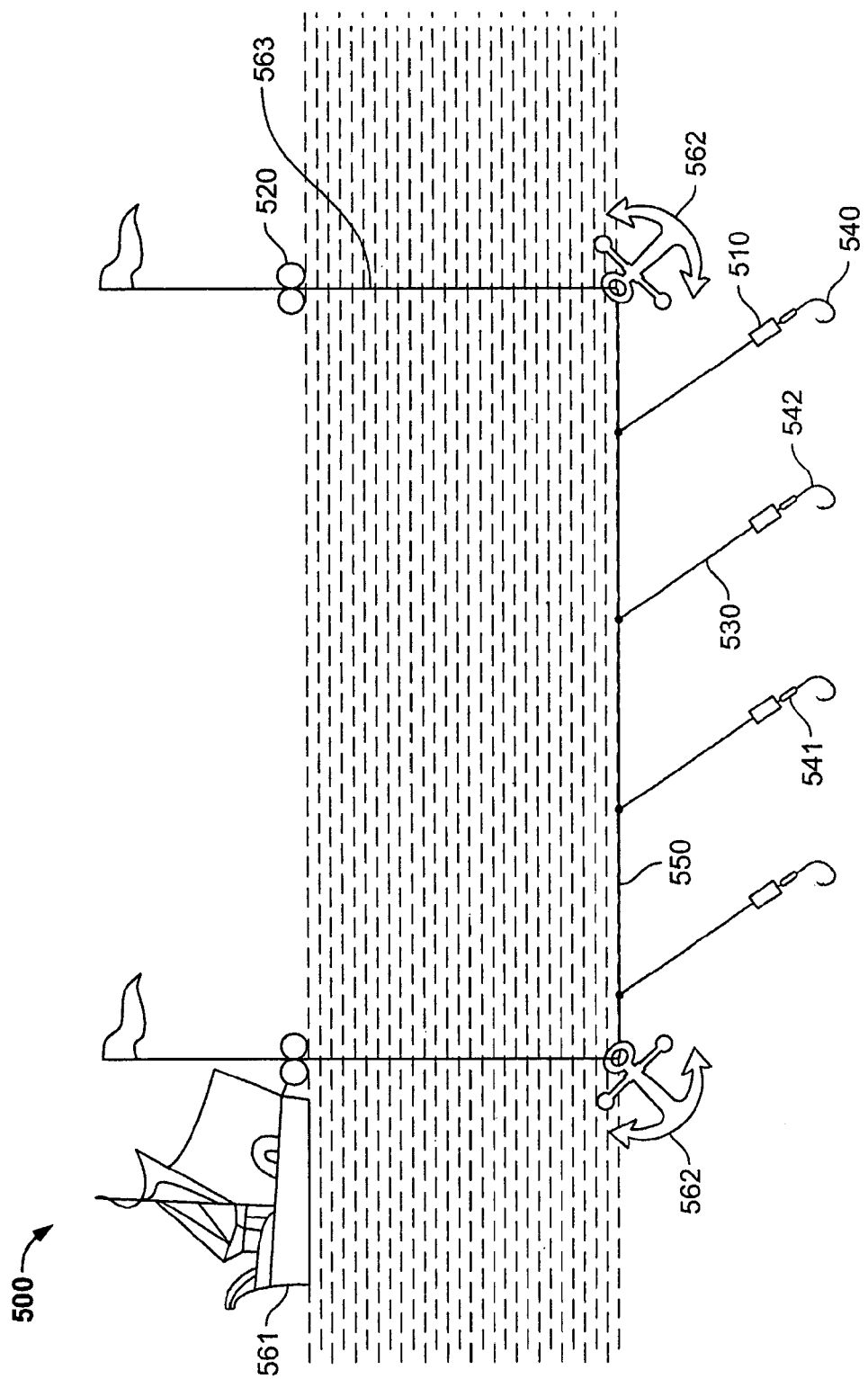
FIG. 5 illustrates a demersal longline with an electropositive metal in accordance with the present invention.

An exemplary and non-limiting method of repelling elasmobranchs involving repelling elasmobranchs from longlines in accordance with the invention is illustrated in FIG. 5. A longline (500) may be deployed from a boat (561) to fish for a target fish of interest. The main line (550) of the longline may be attached to a buoy (520) and at a set distance from the buoy may be attached to an anchor (562). A set of gangions (530) with hooks (540) may be attached to the mainline beginning at the anchor (562) and may be spaced sufficiently to limit interaction between individual gangion lines (530). Each hook may have an electropositive metal mounted resting on the hook eye (541). Alternatively, the electropositive metal may be mounted on a hook shank (542) or may be secured to the outside of the hook (540). The hooks may be baited. The longline may be a demersal longline such that the main line is proximal to the ocean or otherwise water's floor. The longline may be a pelagic long line, such that the main line is nearer to the surface of the water, suspending in the water column, typically at 100-500 feet below the surface. In the aspect of the invention where the longline is a pelagic longline, anchors (562) may have less weight or may be absent from the longline apparatus. The longline may also be a semipelagic longline wherein the mainline is further down the water column from the surface as compared to a pelagic line but is not proximal to the water's floor or is not proximal to the water's floor on at least one end of the longline. Use of electropositive metals with longlines reduces by-catch of elasmobranchs.

Longlines comprising electropositive metals may be handled in the commercial environment in a manner similar to those practices known in the art of longline commercial fishing. Because hooks must be carefully managed to control tangling and hooking of objects on a longlining boat, including other portions of the tackle of the longline, commercial fishing operations and those of skill in the art will recognize how to handle longlines with hooks. Electropositive metals on longlines likewise may be handled in the same manners as one would consider appropriate in the art to avoid entanglements.

As described above, electropositive metals of any size may be used in combination with a longline hook so long as the target fish may be caught on the hook. An exemplary electropositive metal on a longline hook may be 2"×0.25"×2". Smaller electropositive metals are also acceptable. Electropositive metals of less than 0.5" cubed may be appropriate for smaller hook settings.

D. Electropositive Metal Repellents on Buoys, Nets and Barges

Figure 6A:
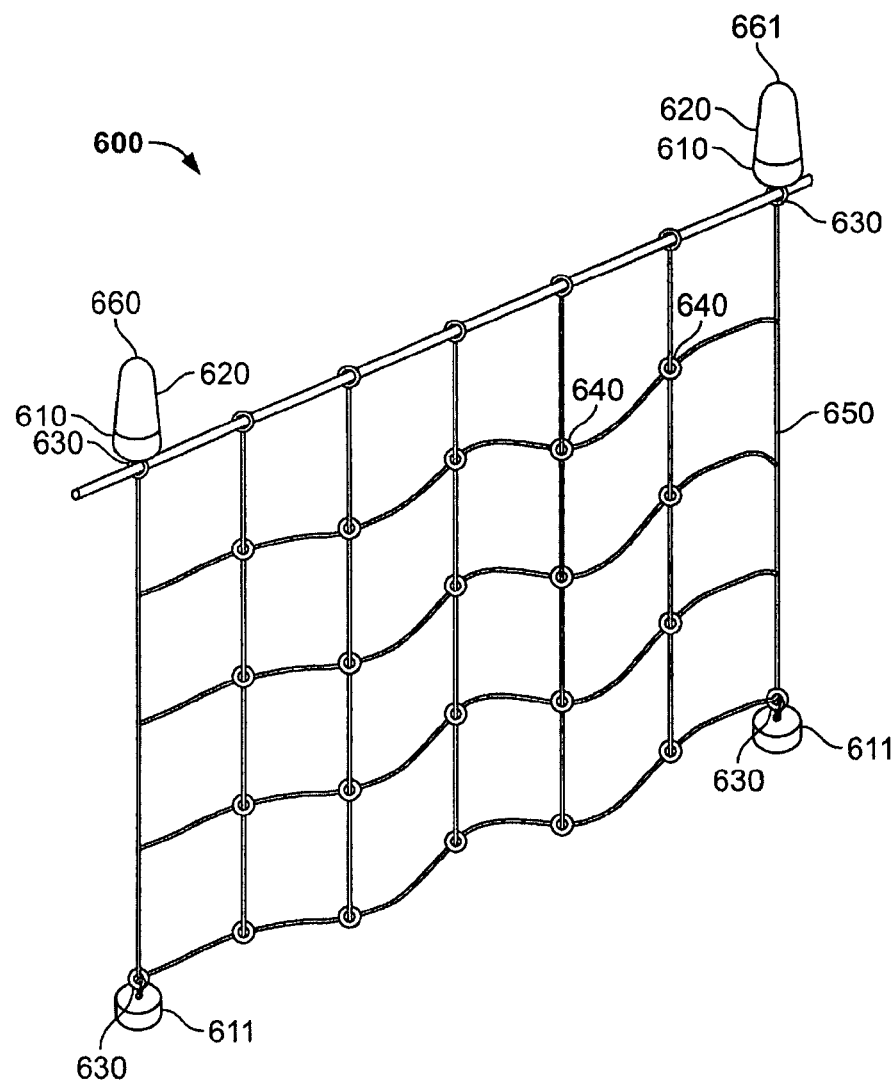
FIGS. 6A-B illustrate non-limiting apparatuses and methods of repelling elasmobranchs in accordance with the present invention.
Figure 6B:
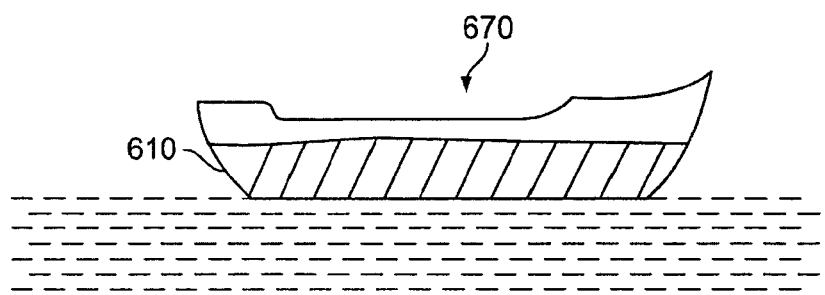

An exemplary and non-limiting method of repelling elasmobranchs with an electropositive metal or a plurality of electropositive metals placed on a buoy or barge or net is illustrated in FIG. 6. Buoys with electropositive metals as their weighted bases are shown as element 660 and 661 in FIG. 6A. The floating portion of the buoy (620) allows the buoy to float while the electropositive metal portion of the buoy (610) remains in the water because of its weight. A series of buoys comprising electropositive metals may be placed in a region to repel elasmobranchs or may be placed around a swimming area or rescue area to repel elasmobranchs. A series of buoys with electropositive metals may be accompanied by a series of electropositive metals submerged (611) in an area of interest, such as a swimming area. As illustrated in FIG. 6B, very large electropositive metals may be placed on a large floating barge (670) comprising an electropositive metal (610).

An exemplary and non-limiting method of repelling elasmobranchs with a plurality of electropositive metals is illustrated in FIG. 6A as element 600, an elasmobranch repelling net apparatus. Buoys (660 and 661) may be employed to float a net (650) comprising a series of electropositive metals (640) held within the net and electropositive metal rings (630) holding the ropes of the net together. The net may be strung to the bottom of the water column using weighted electropositive metals (611). The net may be anchored to a specific location to provide a physical barrier. The net may provide a curtain of electromotive field forces to repel elasmobranchs from an area or to keep elasmobranchs from entering an area of interest, such as a swimming or working area. A net (650) comprising electropositive metals such as those illustrated as elements 610, 611, 630 and 640 may also be used to trawl for fish, shrimp or other aquatic species. In another non-limiting aspect of the invention, electropositive metals may be placed in aquaculture cages to repel sharks from predation or scavenging of cultured stock. Electropositive metals are useful to prevent damage by elasmobranchs to aquaculture cages, nets or other equipment.

E. Surfboard Fitted with Electropositive Metal

Figure 7A:
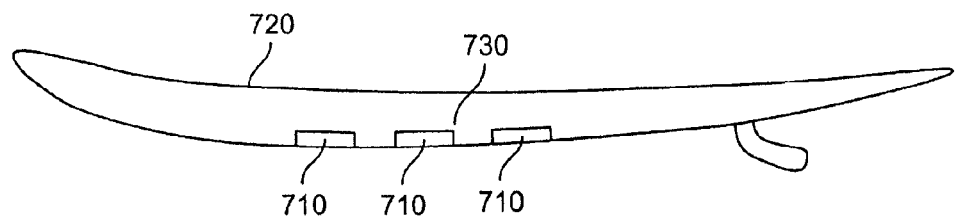
FIGS. 7A-B illustrate non-limiting surfboards with an electropositive metal in accordance with the invention.
Figure 7B:
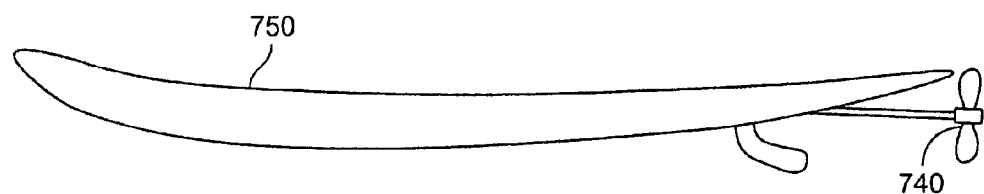
Figure 7C:
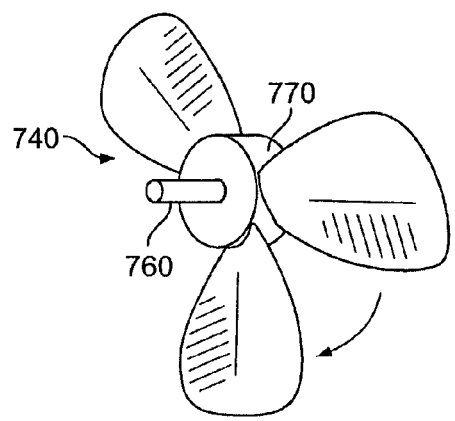
FIG. 7C illustrates electropositive metal or plurality of electropositive metals in association with one another wherein the electropositive metal or metals are capable of spinning when placed in water.

A non-limiting repelling device in accordance with the invention may comprise a surfboard comprising an electropositive metal device. FIG. 7B illustrates exemplary surfboards in accordance with an aspect of the invention. A surfboard (720) may comprise an electropositive metal device such as Mischmetal (710) imbedded, affixed, attached or otherwise associated in any manner contemplated by one of skill in the art with the surfboard An electropositive metal may be pressed into a space drilled into the surfboard (730). It may also be affixed with glue, waterproof tape, Velcro or any other mechanism known in the art now and hereafter.

In an alternative non-limiting example in Figure A, a surfboard (750) may comprise an electropositive metal or plurality of electropositive metals in association with one another wherein the electropositive metal or metals are capable of spinning when placed in water (740). Such a spinning electropositive metal (740) may comprise individual metal pieces attached to a hub (770) that is attached to an axle (760) to allow free spinning of the electropositive metal or metals attached to the surfboard (720) when water current is present.

An electropositive metal may be enclosed in the body of a surfboard or other watercraft or may be trailed behind a surfboard, other watercraft or swimmer.

F. Electropositive Metal Repellents on Swimming and Diving Clothing and Accessories One exemplary non-limiting aspect of the present invention comprises an electropositive metal material for producing an electromotive force field near a swimmer or diver or other person or object in an elasmobranch environment.

Electropositive metals, such as for example, Mischmetal, or other electropositive metals may be worn as a bracelet or a band or otherwise placed in proximity of a person or object. An increase in the number of electropositive metals and an increase in the standard electrode potential of the metals that may be worn increases the electromotive force field around the wearer and increases the repelling activity of the bracelet, band or other metal article.

In a non-limiting example, an omnidirectional electromotive force field may be affixed or arranged near a subject or object exposed to an elasmobranch environment. The electromotive force field may be generated from, for example, an electropositive metal. An electropositive metal may be affixed, for example, to any portion of a swimmer's or diver's body such as the head, the leg, the arm, the torso, the ankle, the wrist, or any other portions of the body.

Figure 8A:
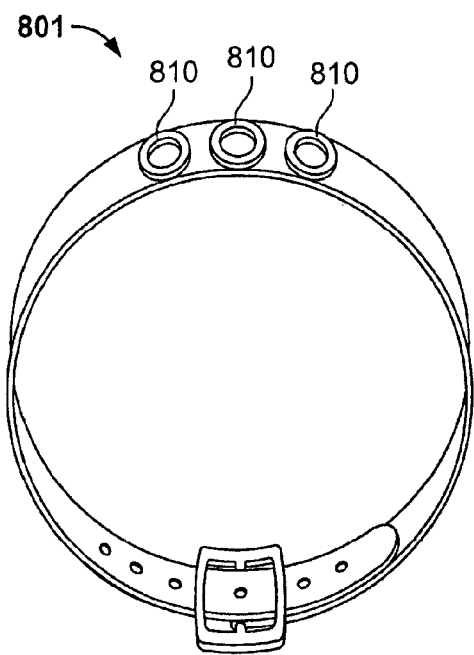
FIGS. 8A-C illustrate accessories for attaching an electropositive metal to a human or other subject or object.
Figure 8B:
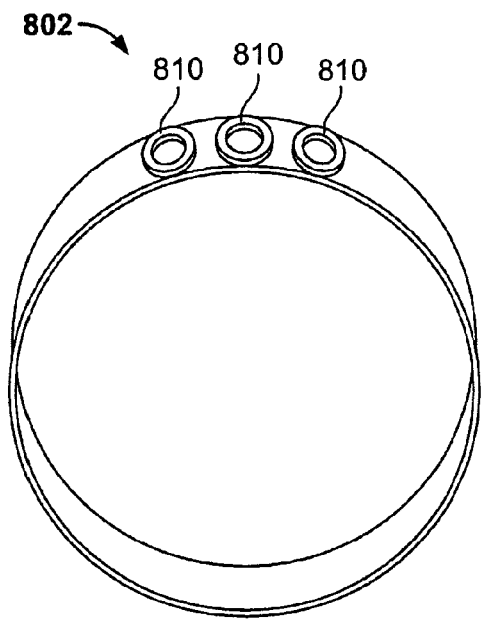
Figure 8C:
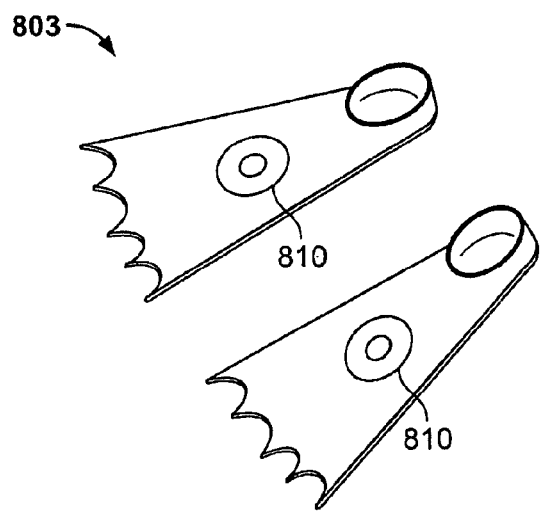

FIG. 8 illustrates a non-limiting example of electropositive metals (810) attached to a belt (801) (FIG. 8A) or bracelet (802) (FIG. 88) or flippers (803) (FIG. 8C).

Electropositive metals may likewise be attached to clothing or water accessories such as swim trunks, wet suits, headbands, flippers, goggles or other piece of clothing or accessory. Electropositive metals may be sewn into such clothing or may be affixed with tape, glue, Velcro or any other mechanism for affixing to clothing or accessories for swimming, diving or otherwise working or playing in water.

Many human-shark interactions in shallow water, especially around the State of Florida in the United States, are hypothesized to be "mistaken identity" by the shark in water with poor visibility. The blacktip shark (*C. limbatus*) and nurse shark (*G. cirratum*) are often implicated in these encounters. The sharks do not have an olfactory clue in most of these "mistaken identity" cases. A series of electropositive metals, such as Mischmetal or other electropositive metal, may be used as means to repel the shark as it approaches within a few inches of the metal. With an electropositive metal, such as Cerium, or an increased number of electropositive metals, to increase electromotive force field strength, repellent activity increases and the chance that a shark will be repelled prior to an investigatory bump or bite is greatly increased.

The invention is further described with the following non-limiting examples, which are provided to further illuminate aspects of the invention.

III. EXAMPLES

Example 1

Tonic Immobility Responses to Electropositive Metals

In order to screen the repellency potential of various metals, 193 individual trials were conducted on juvenile sharks at South Bimini, Bahamas in open ocean pens. All sharks were placed into tonic immobility, and the behavioral response of the shark towards a test metal was scored using a scale of 0 to 4. A score of zero represented no response, with the shark remaining immobilized. A score of one represented a slight fin flinch or eye blink. A score of two represented a slight bend (less than 15 degrees) away from the metal, without rousing. A score of three represented a strong bend away from the metal (more than 15 degrees), without rousing. A score of four represents the termination of tonic immobility, with a rousing response, indicating adequate repellency. No more than three consecutive trials were performed on any one given shark. A minimum of 4 hours of rest was allotted before a shark was retested. Classifying the behavioral scores with a specific group on the Periodic Table of the element demonstrates that the electropositive metals found in Group 2 and Group 3 of the periodic table of elements produced a stronger repellent response than transition metals (Groups 3 through 12), a poor metal (Group 13), a metalloid (Group 16), and a nonmetal (Group 14). See Table 1.

TABLE 1

| Group (Periodic table) | Tests Performed | Average:Score |
| --- | --- | --- |
| Group 1 | 1 | 4 |
| Group 2 | 13 | 3.23 |
| Group 2 Alloy | 34 | 2.79 |
| Group 3 | 84 | 2.28 |
| Group 8 | 6 | 1.17 |
| Group 13 | 4 | 0.75 |
| Group 5 | 5 | 0.20 |
| Group 14 | 21 | 0.10 |
| Group 9 | 5 | 0 |
| Group 7 | 6 | 0 |
| Group 6 | 4 | 0 |
| Group 4 | 5 | 0 |
| Group 16 | 6 | 0 |

The aforementioned tests can also be analyzed in terms of the type of metal tested on the immobilized sharks. As expected, Alkali metals, Alkaline earths, Mischmetals, early Lanthanides, and late Lanthanides produced the highest repellency behavioral scores. These types of metals are electropositive and have revised Pauling electronegativities less then 1.32. See Table 2.

TABLE 2

| Type of metal | Tests Performed | Average Score |
| --- | --- | --- |
| Alkali metal | 1 | 4 |
| Alkaline earth | 13 | 3.23 |
| Mischmetal | 34 | 2.79 |
| Early Lanthanide | 49 | 2.66 |
| Late Lanthanide | 29 | 1.83 |
| Rare Earth | 6 | 1.333 |

TABLE 2-continued

| Type of metal | Tests Performed | Average Score |
|---|---|---|
| Poor metal | 4 | 0.75 |
| Transition metal | 31 | 0.26 |
| Nonmetal | 21 | 0.10 |
| Metalloid | 6 | 0 |

Example 2

Published Standard Electrode Potentials of Electropositive Metals

The published standard electrode potentials (SEP) for the cathode half-cell reaction of electropositive metals is a practical means of determining the repellency of the metal without performing a bioassay. As the cathode half-cell reaction voltage increases, the repellent effect is also expected to increase. The published voltage represents the electromotive force between the electropositive metal and the reference electrode. Published standard electrode potentials typically use a standard hydrogen electrode as the reference electrode. In practice, shark skin is the reference electrode and produces measurable voltages at about 88% of the published standard electrode potentials. The safe handling of highly electropositive metals must be considered, as well as the longevity of the metal in seawater. See Table 3.

TABLE 3

| Cathode metal | SEP (Volts) | Terminates Tonic Immobility? | Safety Comments |
|---|---|---|---|
| Lithium | 3.05 | YES | Short-lived in water |
| Rubidium | 2.98 | PROBABLE | Explosive in water |
| Potassium | 2.93 | PROBABLE | Fire hazard in water |
| Cesium | 2.92 | PROBABLE | Explosive in water |
| Barium | 2.91 | PROBABLE | Short-lived in water |
| Strontium | 2.89 | YES | Short-lived in water |
| Calcium | 2.76 | YES | Short-lived in water |
| Sodium | 2.71 | PROBABLE | Fire hazard in water |
| Lanthanum | 2.52 | YES | Safe for repellent use |
| Cerium | 2.48 | YES | Safe for repellent use |
| Praseodymium | 2.47 | YES | Safe for repellent use |
| Neodymium | 2.44 | YES | Safe for repellent use |
| Samarium | 2.41 | YES | Safe for repellent use |
| Europium | 2.41 | PROBABLE | Corrodes quickly in air |
| Gadolinium | 2.40 | YES | Safe for repellent use |
| Terbium | 2.39 | YES | Safe for repellent use |
| Magnesium | 2.38 | YES | Safe for repellent use |
| Yttrium | 2.37 | YES | Safe for repellent use |
| Dysprosium | 2.35 | YES | Safe for repellent use |
| Holmium | 2.32 | YES | Safe for repellent use |
| Erbium | 2.31 | YES | Safe for repellent use |
| Thulium | 2.31 | PROBABLE | Safe for repellent use |
| Lutetium | 2.30 | PROBABLE | Safe for repellent use |
| Ytterbium | 2.22 | YES | Safe for repellent use |
| Beryllium | 1.847 | NOT PROBABLE | Weakly repellent, toxic oxides |
| Aluminum | 1.662 | NO | Not a repellent |
| Zirconium | 1.45 | NO | Not a repellent |
| Niobium | 1.099 | NO | Not a repellent |
| Chromium | 0.744 | NO | Not a repellent |
| Rhenium | 0.3 | NO | Not a repellent |
| Tungsten | 0.1 | NO | Not a repellent |

Beryllium and Magnesium metals are Alkaline earths in Group 2 of the periodic table of elements. These metals exhibit larger revised Pauling electronegativities (1.56 and 1.31 respectively) than the Lanthanide metals. Magnesium, however, has a higher standard electrode potential (see Table 3) than beryllium and therefore is expected to be a better shark repellent than beryllium. Tonic immobility testing has confirmed that magnesium indeed produces aversive behavior in immobilized juvenile sharks. It is anticipated the beryllium would be weakly repellent based on the published standard electrode potentials. Additionally, the highly toxic nature of beryllium compounds preclude its use as a safe shark repellent.

Example 3

Target Fish not Repelled by Electropositive Metals

Preliminary research conducted on the effects of electropositive metals on adult cobia, *Rachycentron canadum*, suggests that electromotive forces produced by electropositive metals had little effect on captive cobia. Digital video of cobia striking at electropositive metals was recorded. Cobia were observed directly biting electropositive metals as well as transition metals. It is hypothesized that the shiny nature of the metals acted as a visual attractant to the fish. Since bony fish lack the ampullae of Lorenzini organ found in sharks, the fish were unable to detect the electromotive forces produced by the electropositive metals.

What is claimed is:

1. A method for repelling an elasmobranch comprising the application of an electropositive metal lacking permanent magnetism;
wherein the electropositive metal is applied in combination with at least one apparatus associated with fishing; and
wherein the electropositive metal has a revised Pauling electronegativity sufficient to repel an elasmobranch.

2. The method of claim 1, wherein the electropositive metal has a revised Pauling electronegativity less than 1.32 and cathode half-cell standard electrode potential greater than 2.00 volts in seawater.

3. The method of claim 2, wherein the electropositive metal is selected from the group consisting of lanthanum, cerium, praseodynium, neodymium, samarium, europium, gadolinium, terbium, dysprosium, holmium, erbium, thulium, ytterbium, lutetium, yttrium, scandium, magnesium, calcium, strontium, lithium, cerium mischmetal, neodymium-praseodymium mischmetal, ferrocerium, and lanthanum mischmetal, separately or in combination.

4. The method of claim 3, wherein the electropositive metal is magnesium.

5. The method of claim 3, wherein the apparatus associated with fishing is a fishing hook and/or fishing tackle.

6. The method of claim 5, wherein the fishing tackle is at least one of the following selected from the group consisting of: a buoy, a net, a longline, a main line, a gangion, a branchline, and a weight.

7. The method of claim 3, wherein the apparatus associated with fishing is a fishing hook.

8. The method of claim 3, wherein the electropositive metal has a shape of a cylinder, a cone, a circle, a cube, a disk, a bar, a sphere, a plate, a rod, a ring, a tube, a stick, a block, or a tapered cone.

9. The method of claim 3, wherein the elasmobranch is at least one of the following selected from the group consisting of: Galeomorphii, Squalomorphii, Batoidea, Squaliformes, Carcharhiniformes, Lamniformes, Rajiformes, Pristiformes, Torpediniformes, and Orectolobiformes.

10. A method for repelling an elasmobranch comprising the application of an electropositive metal lacking permanent magnetism;

wherein the electropositive metal is attached to a human body, or to clothing or accessories associated with the human body; and wherein the electropositive metal has a revised Pauling electronegativity sufficient to repel an elasmobranch.

11. The method of claim 10, wherein the electropositive metal has a revised Pauling electronegativity less than 1.32 and cathode half-cell standard electrode potential greater than 2.00 volts in seawater.

12. The method of claim 11, wherein the electropositive metal is selected from the group consisting of lanthanum, cerium, praseodynium, neodymium, samarium, europium, gadolinium, terbium, dysprosium, holmium, erbium, thulium, ytterbium, lutetium, yttrium, scandium, magnesium, calcium, strontium, lithium, cerium mischmetal, neodymium-praseodymium mischmetal, ferrocerium, and lanthanum mischmetal, separately or in combination.

13. The method of claim 12, wherein the electropositive metal is attached to a swim suit.

14. The method of claim 12, wherein the electropositive metal is in combination with dive equipment.

15. The method of claim 12, wherein the accessory associated with the human body is a bracelet.

16. A method for repelling an elasmobranch comprising the use of an electropositive metal lacking permanent magnetism;

wherein the electropositive metal is attached to a surfboard; or wherein the electropositive metal is part of an apparatus associated with fishing; and wherein the electropositive metal has a revised Pauling electronegativity sufficient to repel an elasmobranch.

17. The method of claim 16, wherein the electropositive metal has a revised Pauling electronegativity less than 1.32 and cathode half-cell standard electrode potential greater than 2.00 volts in seawater.

18. The method of claim 17, wherein the electropositive metal is selected from the group consisting of lanthanum, cerium, praseodynium, neodymium, samarium, europium, gadolinium, terbium, dysprosium, holmium, erbium, thulium, ytterbium, lutetium, yttrium, scandium, magnesium, calcium, strontium, lithium, cerium mischmetal, neodymium-praseodymium mischmetal, ferrocerium, and lanthanum mischmetal, separately or in combination.

* * * * *